Patented July 29, 1947

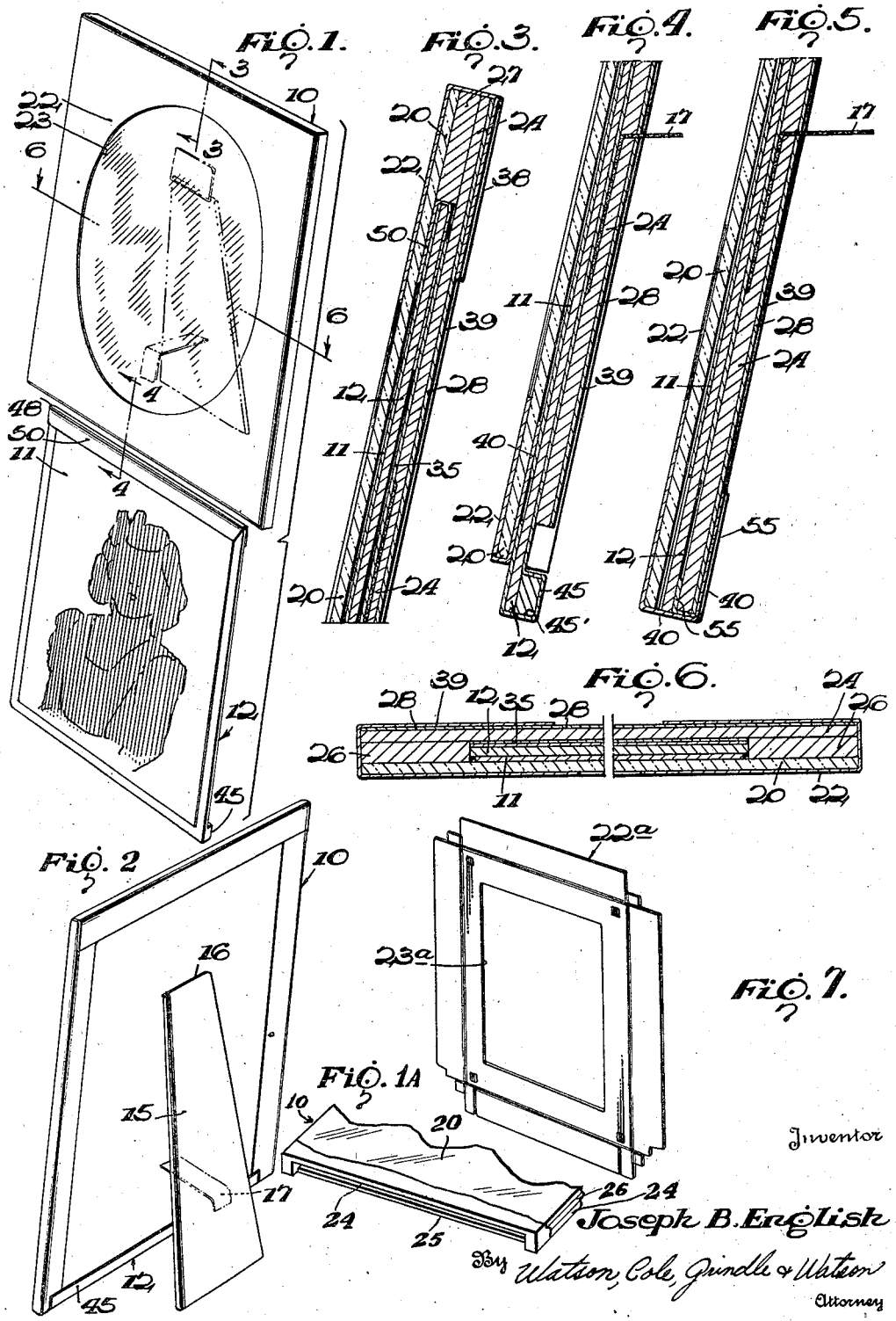

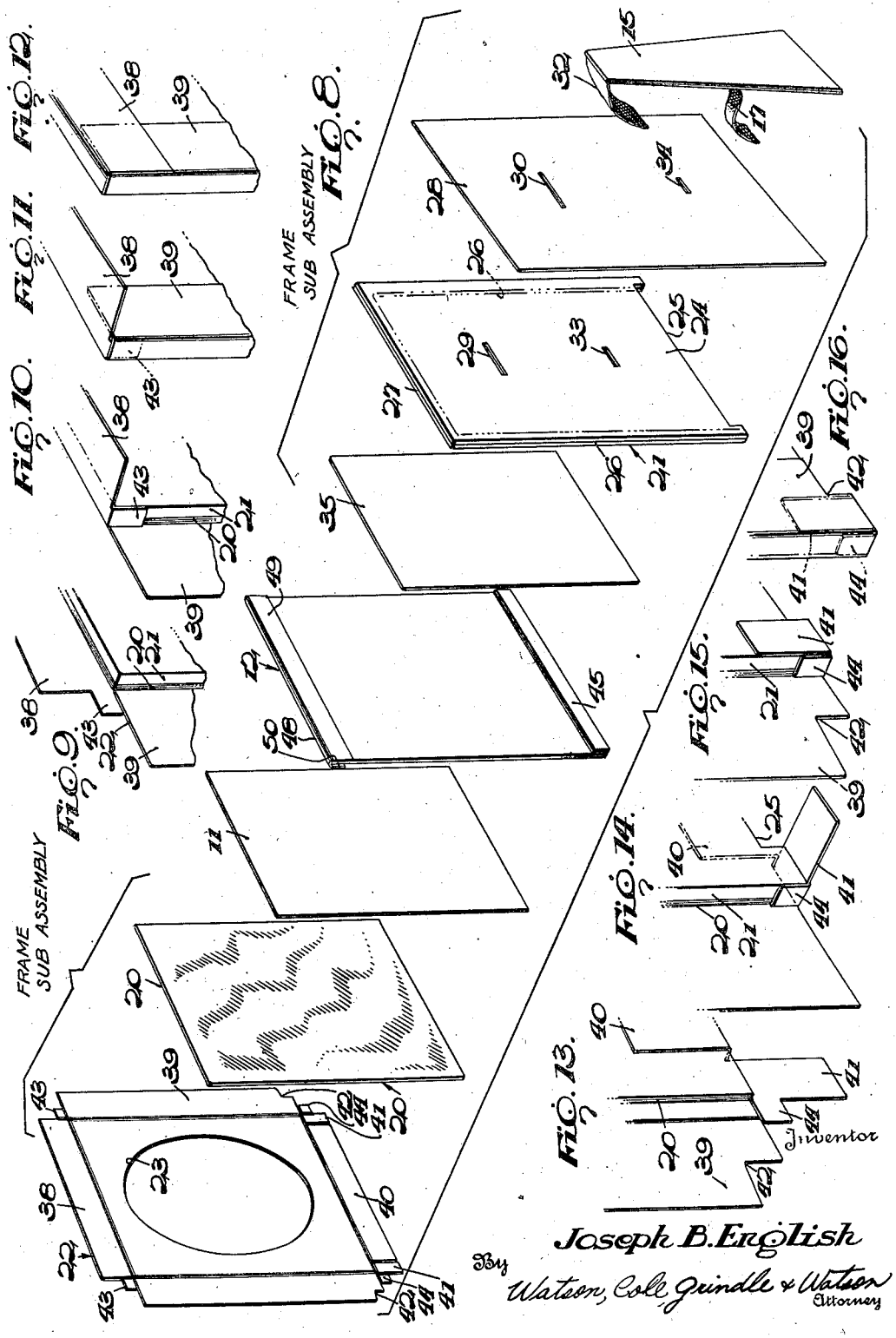

2,424,686

UNITED STATES PATENT OFFICE 2,424,686

PICTURE FRAME

Joseph B. English, Atlanta, Ga.

Application April 17, 1944, Serial No. 531,477

7 Claims. (Cl. 40—152)

This invention relates to exhibiting or displaying devices and has for its principal object the provision of arrangements of this type whereby pictures, cards, papers, or the like may be safely, neatly, and interchangeably supported, protected, and displayed to the best advantage.

Another object of the invention is to provide a novel and improved picture frame which is easily and economically manufactured, in which the enclosure for the picture is of sturdy construction and substantially dust-tight, and which may be readily adapted to the form of an easel or stand.

In its preferred embodiment the invention contemplates the provision of a frame assembly which consists of two separately formed elements, one the enclosing member comprising the easel or frame proper, and the other a picture or card carrying slide member adapted to be inserted into a slot or recess in the frame and moved to a closed position wherein the display matter may be viewed through the opening in the masking portion of the frame.

The frame proper comprises a transparent plate of glass or other suitable material, a backing member having raised edges upon three sides thereof which abut the rear marginal portions of the glass plate when the device is assembled, and a masking sheet which covers the front marginal portions of the plate and is provided with an opening through which the picture may be viewed. The masking sheet is provided with binding projections or flaps of novel configuration along the edges thereof, which serve to secure the parts of the frame together and seal the laminated edges of the assembly.

The picture carrying slide or insert comprises a flat board element having a raised or thickened edge for manipulation, and a flap at the opposite or inserted edge adapted to overlie one margin of the picture or other display matter to protect it as the slide is inserted in the opening or slot in the frame member, and to grip or retain the picture so that it will move with the slide when the latter is withdrawn from the frame. The picture, card, paper, or other sheet to be displayed requires no further means of attachment. Also the width of the slot and the thickness of the slide are so selected that the sheet is pressed firmly against the rear surface of the glass plate which forms one of the main elements of the frame member.

Other objects and features of novelty, including a provision of certain improved details of construction and certain modified forms of the invention, will be apparent from the following specification when read in connection with the accompanying drawings in which certain embodiments of the invention are illustrated by way of example.

In the drawings:

Figure 1 is a view in perspective of a picture frame assembly embodying the principles of the invention; the picture carrying slide being withdrawn from the frame member;

Figure 1A is a fragmentary perspective view of the lower opening and of the frame portion of the assembly, showing the mouth of the pocket for receiving the picture-carrying slide;

Figure 2 is a perspective view of the easel frame as seen from the rear;

Figure 3 is a fragmentary view in vertical section taken on line 3—3 of Figure 1;

Figure 4 is a similar view taken on line 4—4 of Figure 1;

Figure 5 is a sectional view similar to Figure 4 and taken through the corresponding portion of a modified frame comprising an alternative embodiment of the invention;

Figure 6 is a horizontal sectional view taken on line 6—6 of Figure 1;

Figure 7 is a view in perspective of a suggested modification in the masking sheet;

Figure 8 is an exploded perspective view of the frame in the preferred form;

Figures 9 to 12, inclusive, are fragmentary perspective views of an upper corner of the easel frame showing the steps of folding and securing the parts together; and Figures 13 to 16 are similar views of a lower corner showing the successive stages of securing the same.

The appearance of the assembled picture frame or display device will be best appreciated from an inspection of Figures 1 and 2 of the drawings in which the frame proper is designated generally by the reference numeral 10 and the associated slide member which comprises a carrier for the picture is designated by the reference numeral 12. In the illustrated embodiments the device takes the form of an easel support for a picture indicated at 11, but within the scope of the invention the element which is displayed may be a sheet of paper, cardboard, or other material bearing any sort of display matter. A supporting leg 15 may conveniently be applied to the rear surface of the member 10 being pivoted thereto as at 16 and connected therewith adjacent the lower portion as by means of the strap or link 17.

The component elements of the parts 10 and 12 and the manner of assembly are best shown in Figure 8 of the drawings and the sectional views in Figures 3 to 6, inclusive. The frame member 10 consists essentially of three principal elements: a plate 20 which may be of glass or any other rigid transparent material and which is of a size approximating the overall dimensions of the device; a backing element indicated generally by the reference numeral 21, which cooperates with the plate 20 to provide a pocket into which the picture or display matter is inserted; and a masking and closing element 22 which is provided with an opening 23 through which the picture may be viewed.

The backing element 21 is composed chiefly of a board 24 having a rather wide cut-away portion 25 at the lower edge thereof. The board 24 may be made of cardboard or fiberboard of a suitable quality and stiffness. Narrow marginal strips 26 of material similar to that of which the board 24 is made are secured as by means of an adhesive to the side marginal portions of the front face of the board 24. A similar strip 27 is disposed along the upper edge of the front face. These strips 26 and 27 abut the marginal portions of the rear face of the glass plate 20 and serve as filler or spacing elements to provide the central pocket or recess for the reception of the picture carrying slide. The backing element 21 has its rear surface covered by a sheet of paper 28, the rear surface at least of this sheet being preferably suitably colored or ornamented. Both the board 24 and the sheet 28 are provided with registering slots 29 and 30 through which the tab or strip 32 may pass, this tab having one of its ends secured to the leg or prop 15 for the easel, and providing a hinge whereby the leg is pivotally connected to the assembly. After passing through the openings 29 and 30, the part 32, which may be of any durable fabric, is glued or pasted to the forward surface of the board 24. The board 24 and the sheet 28 are also provided with registering slots or openings 33 and 34 through which one end of the link or strap 17 may pass. The end of this element 17 is also secured to the front face of the board 24. After the prop or leg 15 has thus been secured to the backing element 21, a sheet 35 of paper, cloth, or other suitable ornamental material is applied to the forward face of the board 24 within the confines of the pocket area formed by the strips 26 and 27. The sheet 35 effectively conceals the fastening portions of the elements 17 and 32 and aids in securing them firmly to the backing member. The front face of the sheet 35 may be seen through the mask opening of the frame when the picture is applied or removed, and should therefore be of a suitable ornamental character.

After the backing member 21 is applied to the rear face of the plate 20, the masking sheet 22 is laid upon the front surface of the glass plate 20 and preferably secured thereto by means of a suitable adhesive. Then in order to seal the edges of the assembled frame against the possible entry of dust or moisture and to improve the appearance of the margins of the device, certain extended margins or flaps formed on the masking element 22 are folded around the edges of the assembled parts and pasted securely in place. The element 22 is provided with an upper flap 38, two side flaps or wings 39, and a plurality of flaps at its lower margins the wide central one being designated 40 and the two smaller end flaps or tabs being indicated by the numerals 41. The side wings or flaps 39 are notched at their lower corner as at 42, the upper flap 38 is provided with foldable end tabs 43, and the small flaps 41 adjacent the lower portion of the element are also provided with small tabs 44.

The function of the flaps and tabs provided at the upper portions of the device, and the manner of folding and applying them are clearly indicated in Figures 9 to 12 of the drawings. When the masking element 22 is applied to the assembled plate 20 and backing element 21, the flaps at the upper corner are disposed as in Figure 9. Then the upper flap 38 is folded over into a plane extending at right angles to the plane of the element 22 as shown in Figure 10 and the tabs 43 are bent down over the edges of the assembled parts 20 and 21. It is understood that the rear surface of the element 22 including the various flaps and tabs may be coated with a suitable adhesive which need only be moistened at the time the parts are to be assembled, or the entire adhesive may be applied to the appropriate portions at that time. Also, the lines of bending of the various flaps may be previously scored, if desired, so that the flaps may be more readily bent about the frame. As shown in Figure 11 of the drawings, the side wing or flap 39 is then folded around the side edge of the frame, covering the tab 43, and then secured to the back of the backing member 21. Finally, the flap 38 is folded down flat against the back of the frame and secured thereto as clearly shown in Figure 12 of the drawings.

The application of the masking and sealing sheet 22 to the lower portion of the assembly is somewhat more complicated than at the upper portion which is described, on account of the provision of the cut-away part 25 in the backing member 21 at the entrance to the pocket or recess provided for the picture and its slide. First of all, the bottom flap 40 of the sheet 22 is folded up around the bottom edge of the glass plate 20 into the mouth of the pocket and opposite the cut-away part 25 of the backing board 24. Then the flaps 41 are bent forwardly at right angles as shown in Figure 14 and the flaps 44 secured to the edges of the assembly at each corner. The ends of the flaps 41 are then secured to the rear face of the backing element as shown in Figure 15. Finally as the side wings or flaps 39 are folded around the edges of the device the sealing of the corner is completed, the flap 39 effectively covering the tabs 41 and 44, and the cut-away or notched part 42 of the flap 39 accommodating itself to the configuration of the end of the cut-away portion 25 of the backing board.

After the flaps and tabs of the masking and sealing sheet 22 have been secured as described, the frame 10 is completed and is ready for the insertion of the picture 11 or other display matter. The picture is guided into place within the pocket in the frame member by means of the sliding element 12, this element being made of cardboard, fiberboard, or other similar material which need not be quite as thick or stiff as the backing board 24. A strip or ledge element 45 is secured along the bottom edge of the slide 12 by means of a suitable adhesive and if desired this projecting ledge may be covered with ornamental paper or the like. When the device is assembled the ledge 45 will occupy the cut-away portion 25, effectively sealing the opening into the pocket and providing a handling or manipulative projection facilitating movement of the slide and picture.

At the upper end of the slide 12 there is provided a flap or return bent projection 48 which is preferably formed of fairly stiff paper. This flap or projection may be glued or pasted to the rear surface of the element 12 as at 49 and bent around the element 12 to form a projection 50 which is adapted to overlie the upper edge of the picture 11.

In applying the picture to the frame it is laid upon the front face of the slide 12 with the upper edge inserted beneath the flap 50 as clearly shown in Figure 1 of the drawings. Then the upper edge of the slide is inserted within the recess of the frame and moved upwardly therein until the picture is centered within the opening 23 of the masking member 22, whereupon the lower edge 45 of the slide 12 abuts the cut-away part 25 of the backing board 24 and effectively seals the pocket as clearly shown in Figures 2 and 4 of the drawings. It will be noted that the narrow recess for the insertion of the picture and slide, is provided by the spacing strips 26 and 27 on three sides of the frame and the omission of such a spacing strip at the bottom, provides an entrance to the recess.

In Figure 7 there is shown a slight modified form of masking sheet which is indicated by the reference numeral 22A and being provided in this modification with a rectangular opening 23A through which the picture may be viewed when the sheet 22A is applied to the frame. The configuration of the sheet 22A is otherwise the same as that of the sheet 22 originally described. It will be understood that any suitable ornamental features may be applied to the exposed surfaces of the masking elements 22 and 22A and these elements may be made of paper, cloth, leather, artificial fabrics or any other suitable material whether embossed, engraved, or printed in any desired way.

In Figure 5 a modification is illustrated and this form of the device may be used when the picture or other display feature is to be more or less more permanently installed in the frame and where it is desired to make a more perfect dust and moisture seal for the arrangement. In this embodiment, instead of cutting away the lower edge of the backing board 24 as at 25 in the previously described embodiment, the board is of the same overall configuration as the glass plate 20. The ledge or handle strip 45 is omitted from the slide 12 and this element may be replaced by a simple paper tab or strip 55 if desired. In this embodiment the bottom central flap 49 is not secured until the slide 12 has been inserted together with the picture. After the slide and picture have been properly placed in the pocket of the frame the flap 40 is folded around the bottom edge of the assembly and secured in place as shown in Figure 5 effectively sealing the pocket and closing it against removal of the slide and picture.

Other changes and modifications may be made in the embodiments illustrated and described herein without departing from the scope of the invention as defined by the subjoined claims.

Having thus described the invention, what is claimed as new and desired to be secured by Letters Patent is:

1. A display device for relatively thin and flexible sheet material comprising, in combination, a pocketed frame member and a slide against which the sheet to be displayed is placed, said frame member comprising a transparent plate, a backing element substantially co-terminous with said plate, the plate and backing element being disposed in parallel planes and spaced apart throughout the greater portion of their areas to form a flat pocket therebetween, and means for securing certain margins of the plate and backing element together, said slide comprising a sheet of stiff material of a thickness to snugly fit within the pocket, and having a short relatively stiff flap at its insertable end overlying an edge only of the display sheet lying thereagainst, thereby facilitating the insertion of said display sheet and effecting its withdrawal with the slide.

2. A display device for relatively thin and flexible sheet material comprising, in combination, a pocketed frame member and a slide against which the sheet to be displayed is placed, said frame member comprising a rigid transparent plate, a backing element substantially co-terminous with said plate, the plate and backing element being disposed in parallel planes and spaced apart throughout the greater portion of their areas to form a flat pocket therebetween, and means for securing three margins of the plate and backing element together, said slide comprising a sheet of stiff material of a size to snugly fit within the pocket, and having a relatively stiff flap at its insertable end overlying an edge of the display sheet for effecting its withdrawal with the slide, and a thickened portion on the opposite end of the slide for sealing the pocket opening at the fourth margin of the device and providing means for grasping the slide for insertion and removal.

3. A display device for relatively thin and flexible pictures or the like comprising, in combination, a pocketed frame member and a slide member adapted to guide the picture to and from its inserted position within the pocket of the frame member, said frame member having as its basic element a plate of glass, a backing member secured to the rear face of the plate and disposed parallel thereto, filler strips disposed along three margins of the backing member, abutting the marginal portions of the rear face of the plate, and serving to hold the backing member in spaced relationship to the greater portion of the plate and providing a pocket therebetween, the slide member comprising a relatively stiff sheet provided with a short return-bent hook-like flap at its upper insertable edge overlying the edge only of a picture laid upon the slide member, to facilitate removal of the picture from the frame member, the thickness of the stiff slide member being such that it fits snugly within the pocket so as to press the picture against the rear face of the glass plate with sufficient force to prevent wrinkling or bulging of the picture.

4. A display device for pictures or the like comprising, in combination, a pocketed frame member and a slide member adapted to guide the picture to and from its inserted position within the pocket of the frame member, said frame member comprising a rectangular glass plate, a similarly shaped backing board occupying a plane relatively close to and parallel with that of the plate, thin spacing strips between the adjacent marginal portions of the rear face of the plate and the board along three sides whereby a thin recess or pocket is formed into which the picture carrying slide member may be frictionally inserted, a masking sheet applied to the front face of the plate and having an opening therein through which the picture may be viewed, said masking sheet being provided with marginal flaps along its four side edges, three of said flaps being folded around and secured to three margins of the backing board and spacing strips, and the fourth flap folded around and secured to the edge of the glass plate at the mouth of the pocket on the fourth margin.

5. A display device for pictures or the like comprising, in combination, a pocketed frame member and a slide member adapted to guide the picture to and from its inserted position within the pocket of the frame member, said frame member comprising a rectangular glass plate, a similarly shaped backing board occupying a plane relatively close to and parallel with that of the plate, thin spacing strips between the adjacent marginal portions of the rear face of the plate and the board along three sides whereby a thin recess or pocket is formed into which the picture carrying slide member may be frictionally inserted, said backing board being cut away along the fourth side for a short distance and the slide being provided with a narrow widened part adjacent its outer end forming a ledge fitting into the cut-away portion of the backing board.

6. A display device for pictures or the like comprising, in combination, a pocketed frame member and a slide member adapted to guide the picture to and from its inserted position within the pocket of the frame member, said frame member comprising a rectangular glass plate, a similarly shaped backing board occupying a plane relatively close to and parallel with that of the plate, thin spacing strips between the adjacent marginal portions of the rear face of the plate and the board along three sides whereby a thin recess or pocket is formed into which the picture carrying slide member may be frictionally inserted, a masking sheet applied to the front face of the plate and having an opening therein through which the picture may be viewed, said masking sheet being provided with marginal flaps along its four side edges, three of said flaps being folded around and secured to three margins of the backing board and spacing strips, and the fourth flap folded around and secured to the edge of the glass plate at the mouth of the pocket on the fourth margin, and foldable tabs provided on the masking sheet adjacent the corner of the body portion thereof and attached to certain of said flaps, said tabs adapted to be folded against the edges of the corner of the plate and backing board, prior to the folding of said flaps.

7. A display device for pictures or the like comprising, in combination, a pocketed frame member and a slide member adapted to guide the picture to and from its inserted position within the pocket of the frame member, said frame member comprising a rectangular glass plate, a similarly shaped backing board occupying a plane relatively close to and parallel with that of the plate, thin spacing strips between the adjacent marginal portions of the rear face of the plate and the board along three sides whereby a thin recess or pocket is formed into which the picture carrying slide member is frictionally inserted, a masking sheet pasted to the front face of said plate and having an opening therein through which the picture can be viewed, extended marginal portions on three sides of said masking sheet being folded over the edges of the plate, the spacing strip, and the backing board, and pasted to the rear side of the backing board, whereby the laminated edges of the frame member are sealed and the parts thereof held securely in assembled condition, the fourth margin of said masking sheet being folded over the mouth of the pocket and pasted to the rear surface of the backing board and serving to retain the slide and picture within the pocket and exclude dust therefrom.

JOSEPH B. ENGLISH.

REFERENCES CITED

The following references are of record in the file of this patent:

UNITED STATES PATENTS

| Number | Name | Date |
|---|---|---|
| 577,676 | Bartoszewicz | Feb. 23, 1897 |
| 1,882,236 | Stockman | Oct. 11, 1932 |
| 1,331,009 | Ford | Feb. 17, 1920 |
| 2,273,351 | Gunder | Feb. 17, 1942 |
| 654,514 | Carraine | July 24, 1900 |
| 2,281,049 | Powell | Apr. 28, 1942 |
| 2,292,744 | Cross | Aug. 11, 1942 |